US011992098B2

United States Patent
Ono et al.

(10) Patent No.: US 11,992,098 B2
(45) Date of Patent: May 28, 2024

(54) HOOK-AND-LOOP FASTENER-EQUIPPED RESIN MOLDED BODY, METHOD FOR MANUFACTURING SAME, AND METHOD FOR FIXING AUTOMOBILE CEILING MATERIAL TO VEHICLE BODY

(71) Applicant: KURARAY FASTENING CO., LTD., Osaka (JP)

(72) Inventors: Satoru Ono, Sakai (JP); Yoshikatsu Fujisawa, Sakai (JP); Yuichi Itoi, Tsukuba (JP)

(73) Assignee: Kuraray Fastening Co., Ltd., Osaka (JP)

( * ) Notice: Subject to any disclaimer, the term of this patent is extended or adjusted under 35 U.S.C. 154(b) by 79 days.

(21) Appl. No.: 17/610,464

(22) PCT Filed: May 21, 2020

(86) PCT No.: PCT/JP2020/020117
§ 371 (c)(1),
(2) Date: Nov. 11, 2021

(87) PCT Pub. No.: WO2020/235633
PCT Pub. Date: Nov. 26, 2020

(65) Prior Publication Data
US 2022/0218074 A1    Jul. 14, 2022

(30) Foreign Application Priority Data
May 21, 2019    (JP) .................................. 2019-094985

(51) Int. Cl.
*A44B 18/00*    (2006.01)
*B29C 45/14*    (2006.01)
(Continued)

(52) U.S. Cl.
CPC .......... *A44B 18/0076* (2013.01); *B29C 45/14* (2013.01); *B60R 13/0206* (2013.01);
(Continued)

(58) Field of Classification Search
CPC . B60R 13/0212; B29L 2031/30; B29C 45/14; A44B 18/0076; B29K 2023/12
See application file for complete search history.

(56) References Cited

U.S. PATENT DOCUMENTS

| | | | | |
|---|---|---|---|---|
| 5,900,303 A | * | 5/1999 | Billarant | A44B 18/0076 24/442 |
| 6,596,371 B1 | * | 7/2003 | Billarant | B29C 33/16 24/442 |

(Continued)

FOREIGN PATENT DOCUMENTS

| | | |
|---|---|---|
| JP | 4-91105 U | 8/1992 |
| JP | H10-318221 A | 12/1998 |

(Continued)

OTHER PUBLICATIONS

English Translation of the Written Opinion of the IPER for JP2020/020117 (Year: 2020).*

(Continued)

*Primary Examiner* — Robert Sandy
*Assistant Examiner* — Michael S Lee
(74) *Attorney, Agent, or Firm* — Element IP, PLC

(57) ABSTRACT

The present invention provides a resin molded body with a hook-and-loop fastener excellent in engaging force, and a method for producing the same. In addition, the present invention provides a method for fixing a ceiling material for automobiles to a vehicle body, which has an adhesive force for a long period of time even under high temperature or low temperature conditions, is excellent in productivity, and does not cause a problem such as falling of a male-type engaging (Continued)

element even when a hot melt adhesive is used. A resin molded body with a hook-and-loop fastener, which is formed by integrating a non-foamed resin molded body and a male-type molded hook-and-loop fastener, wherein the male-type molded hook-and-loop fastener has at least a base plate, a plurality of male-type engaging elements rising from a front surface of the base plate, and a plurality of embedded elements rising from a back surface of the base plate, wherein a resin constituting the male-type molded hook-and-loop fastener is at least one selected from polyester elastomer and polyamide, and the resin molded body and the male-type molded hook-and-loop fastener are integrated by embedding at least a part of the embedded elements in the resin molded body.

13 Claims, 3 Drawing Sheets

(51) Int. Cl.
  *B60R 13/02* (2006.01)
  *B29K 23/00* (2006.01)
  *B29K 67/00* (2006.01)
  *B29L 31/30* (2006.01)
(52) U.S. Cl.
  CPC ...... *B60R 13/0212* (2013.01); *B29K 2023/12* (2013.01); *B29K 2067/00* (2013.01); *B29L 2031/30* (2013.01)

(56) References Cited

U.S. PATENT DOCUMENTS

| | | | |
|---|---|---|---|
| 2001/0007166 A1* | 7/2001 | Shimamura | B29C 33/16 24/452 |
| 2002/0023322 A1* | 2/2002 | Murasaki | A44B 18/0076 24/452 |
| 2008/0120815 A1 | 5/2008 | Line | |
| 2011/0030176 A1* | 2/2011 | Itoh | A44B 18/0076 264/274 |

FOREIGN PATENT DOCUMENTS

| | | |
|---|---|---|
| JP | H11-127915 A | 5/1999 |
| JP | 2003289909 A | 10/2003 |
| JP | 2007530114 A | 11/2007 |
| JP | 2015002794 A | 1/2015 |
| JP | 2016028794 A | 3/2016 |
| JP | 2016214716 A | 12/2016 |
| JP | 2017001555 A | 1/2017 |
| JP | 2018069962 A | 5/2018 |
| JP | 2018089235 A | 6/2018 |

OTHER PUBLICATIONS

International Search Report issued Aug. 18, 2020 in PCT/JP2020/020117 (with English translation), 8 pages.
Extended European Search Report issued Jan. 16, 2023 in Patent Application No. 20810601.3, 8 pages.

* cited by examiner

[Fig. 1]
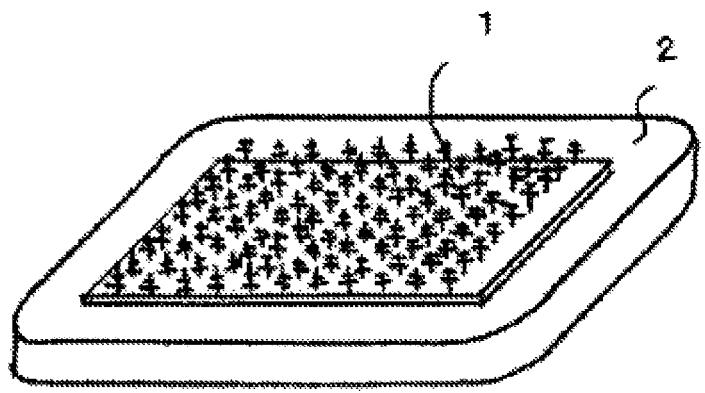
[Fig. 2]
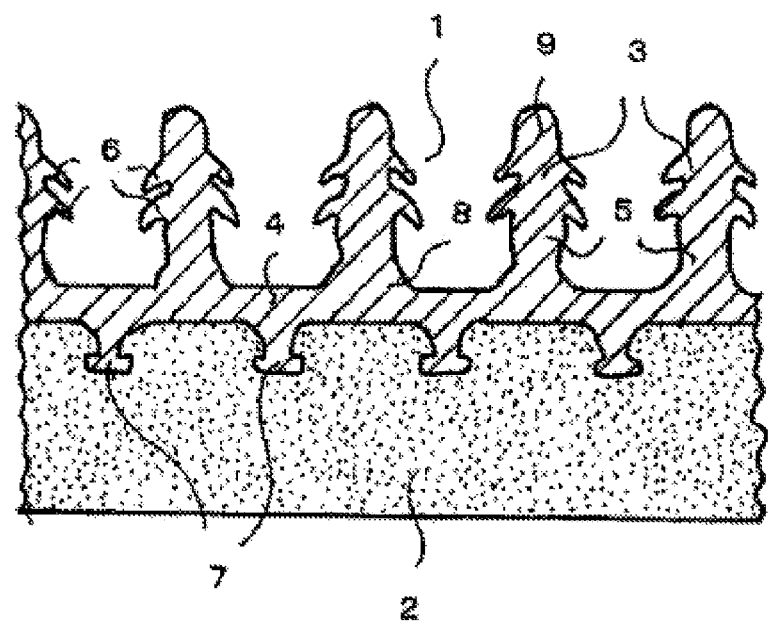

[Fig. 3]
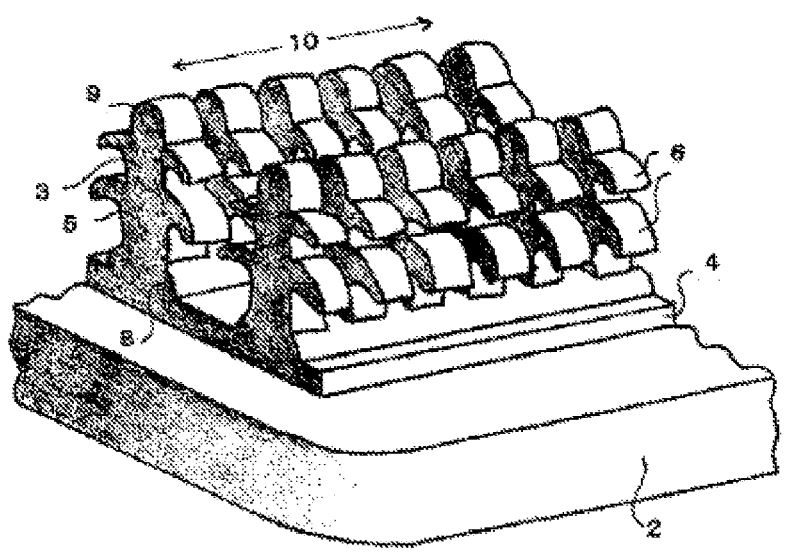
[Fig. 4]
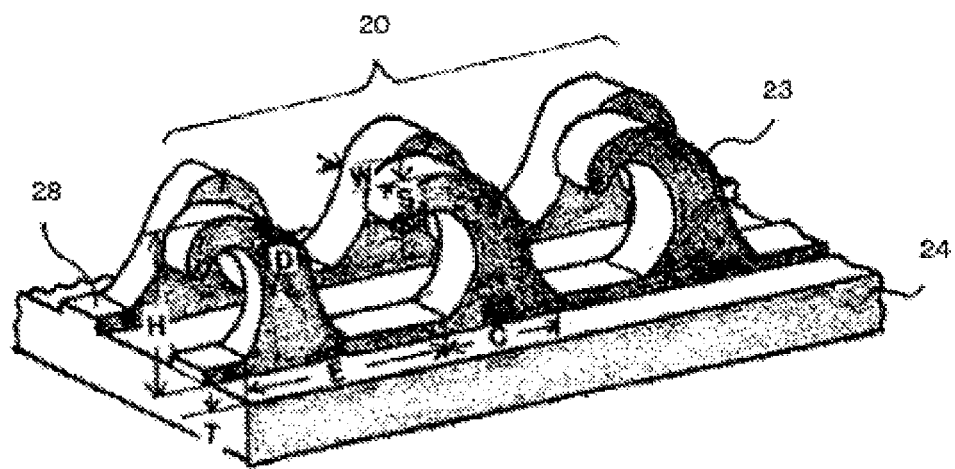

[Fig. 5]
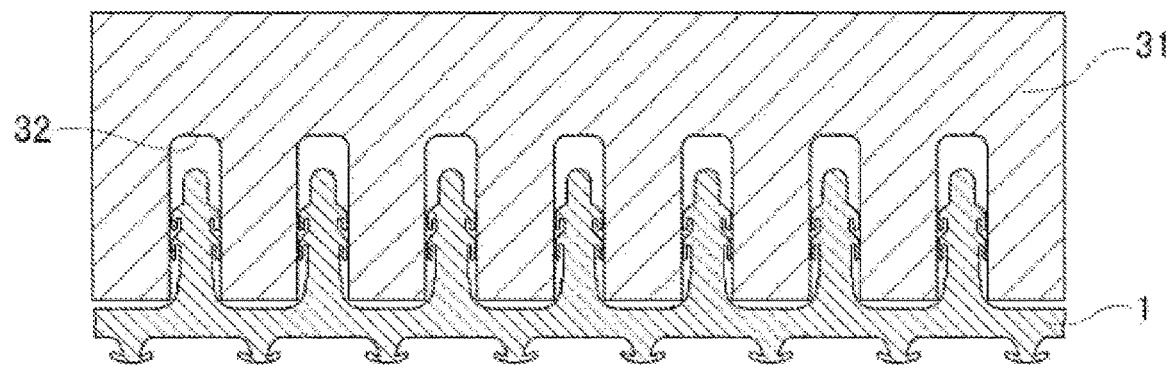
[Fig. 6]
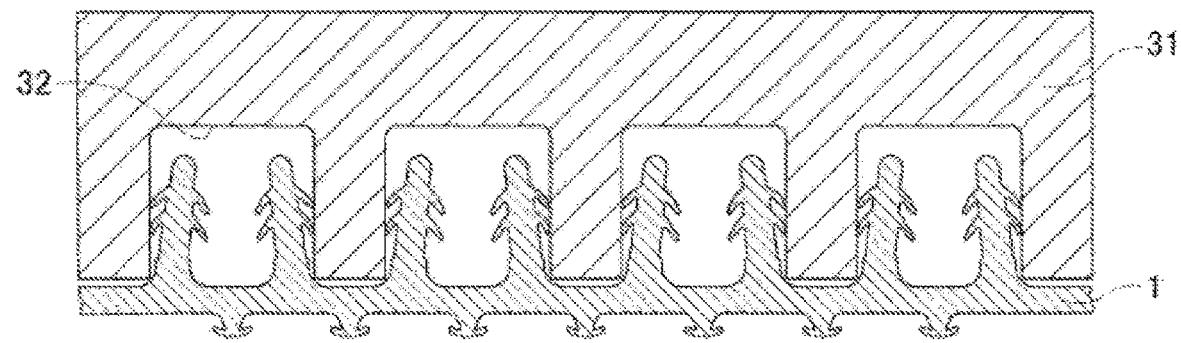

HOOK-AND-LOOP FASTENER-EQUIPPED RESIN MOLDED BODY, METHOD FOR MANUFACTURING SAME, AND METHOD FOR FIXING AUTOMOBILE CEILING MATERIAL TO VEHICLE BODY

TECHNICAL FIELD

The present invention relates to a resin molded body with a hook-and-loop fastener for fixing a ceiling material for automobiles to a vehicle body, a method for producing the same, and a method for fixing a ceiling material for automobiles to a vehicle body.

BACKGROUND ART

Conventionally, as one of means for attaching an object to a surface of an article, a method has been used in which a male-type hook-and-loop fastener having a hook-type engaging element is fixed to one of the surface of the article and the surface of the object, a female-type hook-and-loop fastener having a loop-type engaging element is fixed to the other, and these are superposed and engaged with each other to fix the article and the object.

Also in the field of automobiles, a combination of a male-type hook-and-loop fastener and a female-type hook-and-loop fastener is used as a means for fixing a ceiling member to a vehicle body. Specifically, a method has been used in which a male-type hook-and-loop fastener is attached to a back surface of a ceiling material for automobiles, a female-type hook-and-loop fastener is attached to a vehicle body side, and the ceiling material is fixed to the vehicle body by engaging both hook-and-loop fasteners.

As a male-type hook-and-loop fastener which is a constituent element of such a hook-and-loop fastener, there is known a fabric-based male-type hook-and-loop fastener in which a monofilament is formed into a hook shape and fixed to a surface of a base fabric made of a woven fabric. This fabric-based male-type hook-and-loop fastener has an advantage that the engaging force does not decrease even if engagement and peeling are repeated, but on the other hand, the engaging force itself is low and is not suitable as a hook-and-loop fastener for fixing a ceiling material for automobiles requiring a high engaging force.

Therefore, as a hook-and-loop fastener used for fixing a ceiling material for automobiles, a male-type molded hook-and-loop fastener in which a large number of thick male-type engaging elements made of a resin are present on the surface of a base plate made of the same resin sheet is preferable, and various male-type molded hook-and-loop fasteners capable of obtaining a high engaging force have been proposed.

For example, PTL 1 describes that a male-type molded hook-and-loop fastener produced from a polyolefin-based thermoplastic resin such as polyethylene or polypropylene, a polyester-based thermoplastic resin such as polyethylene terephthalate or polybutylene terephthalate, or a polyamide-based thermoplastic resin such as nylon 6 or nylon 66, or a polyester-based, polyolefin-based or polyurethane-based elastomer resin is used as a male-type molded hook-and-loop fastener used for fixing an interior material for a ceiling of an automobile to a vehicle body, and such a male-type molded hook-and-loop fastener is attached to a back surface of a ceiling material for automobiles by an adhesive or a pressure-sensitive adhesive, or melting, sewing, a stapler, or the like.

PTL 2 also describes that a male-type molded hook-and-loop fastener made of the same resin as the resin described in PTL 1 is attached to the back surface of a ceiling material for automobiles with a pressure-sensitive adhesive.

However, in the case of a method of attaching using a pressure-sensitive adhesive or an adhesive, it is required that an automobile has a strong pressure-sensitive adhesive force or an adhesive force even at a high temperature exceeding 120° C. or a low temperature of −30° C. or lower, and further the pressure-sensitive adhesive force or the adhesive force does not deteriorate over a long period of time, and there are few pressure-sensitive adhesives or adhesives satisfying such a requirement.

Further, in the case of using an adhesive, since the fastener back surface and the pressure-sensitive adhesive or the adhesive are often made of different resin types and materials, it is necessary to perform a backing treatment on the fastener back surface or attach a composite material compatible with the adhesive to the fastener back surface by post-processing to form a composite for the purpose of firmly adhering between the fastener back surface and the adhesive. Furthermore, in the case of using an adhesive, curing is required until a sufficient adhesive force is developed after adhesion, which leads to a problem that productivity is deteriorated in a final step of assembling products such as parts and automobile bodies or at a timing close to the final step, and in addition, a solvent used for the adhesive deteriorates work environment.

Further, PTL 3 describes that a hot melt adhesive is applied to the back surface of a male-type molded hook-and-loop fastener made of the same resin as the resin described in PTL 1, and the hot melt adhesive is melted to attach the hook-and-loop fastener to the back surface of a ceiling material for automobiles in a superposing manner.

However, in the case of a bonding method using a hot melt adhesive, if a hot melt adhesive resistant to high temperatures is used, the base plate of the hook-and-loop fastener is easily softened by heat generated when the hot melt adhesive is melted, and if the hook-and-loop fastener is pressure bonded to the back surface of a ceiling material for automobiles or a floor material in this state, the male-type engaging elements rising from the surface of the base plate easily fall down, and the engaging performance of the hook-and-loop fastener is impaired. Further, similarly to the adhesive, since the fastener back surface and the hot melt adhesive are often made of different resin types and materials, it is necessary to perform a backing treatment on the fastener back surface or attach a composite material compatible with the adhesive to the fastener back surface by post-processing to form a composite for the purpose of firmly adhering between the fastener back surface and the adhesive. Furthermore, also in the case of using a hot melt adhesive, curing is required until a sufficient adhesive force is developed after adhesion, which leads to a problem that productivity is deteriorated in a final step of assembling products such as parts and automobile bodies or at a timing close to the final step.

In addition, in the case of a method of attaching using a stapler or sewing, since a needle is driven or a thread is sewn from a surface on which the male-type engaging element is present, there is a problem that the male-type engaging element is easily damaged and the hook-and-loop fastener is easily broken from a hole opened by driving the needle or a perforation. Further, since the force applied to the hook-and-loop fastener is concentrated on a portion fixed by a stapler or a thread, there is a problem that the hook-and-loop fastener is easily broken from the same portion.

CITATION LIST

Patent Literature

PTL 1: JP 2016-28794 A
PTL 2: JP 2016-214716 A
PTL 3: JP 2017-1555 A

SUMMARY OF INVENTION

Technical Problem

The present invention has been made in view of the conventional problems described above, and provides a resin molded body with a hook-and-loop fastener having an excellent engaging force, and a method for producing the resin molded body.

In addition, the present invention provides a method for fixing a ceiling material for automobiles to a vehicle body, which has an adhesive force for a long period of time even under high temperature or low temperature conditions, is excellent in productivity, and does not cause a problem such as falling of a male-type engaging element even when a hot melt adhesive is used.

Solution to Problem

That is, the gist of the present invention is the following [1] to [13]. [1] A resin molded body with a hook-and-loop fastener, which is formed by integrating a non-foamed resin molded body and a male-type molded hook-and-loop fastener, wherein the male-type molded hook-and-loop fastener has at least a base plate, a plurality of male-type engaging elements rising from a front surface of the base plate, and a plurality of embedded elements rising from a back surface of the base plate, wherein a resin constituting the male-type molded hook-and-loop fastener is at least one selected from polyester elastomer and polyamide, and the resin molded body and the male-type molded hook-and-loop fastener are integrated by embedding at least a part of the embedded elements in the resin molded body.

[2] The resin molded body with a hook-and-loop fastener as set forth in [1] above, wherein the male-type engaging element has a stem portion rising from the base plate and a protruding portion protruding from the stem portion, the protruding portion protrudes from a middle or a tip of the stem portion, and the tip of the protruding portion is inclined in a direction of the base plate.

[3] The resin molded body with a hook-and-loop fastener as set forth in [1] above, wherein the male-type engaging element is an engaging element that rises from the base plate, gradually tapers from a root to a tip without branching in the middle or at the tip portion, bends in the same direction as the row direction of the male-type engaging elements in the middle, and has a shape in which the tip approaches the surface of the base plate.

[4] The resin molded body with a hook-and-loop fastener as set forth in [2] above, wherein two or more of the protruding portions are provided in a vertical direction of the stem portion, and a total of four or more of the protruding portions are provided bilaterally symmetrically with respect to the stem portion.

[5] The resin molded body with a hook-and-loop fastener as set forth in any one of [1] to [4] above, wherein a ridge portion continuous in a row direction is present on the base plate, and the male-type engaging element is formed on the ridge portion along the row direction.

[6] The resin molded body with a hook-and-loop fastener as set forth in any one of [1] to [5] above, wherein the male-type molded hook-and-loop fastener and the resin molded body have different color tones.

[7] The resin-molded body with a hook-and-loop fastener as set forth in any one of [1] to [6] above, wherein the base plate has a thickness of 0.10 to 0.40 mm, and a height of the male-type engaging element from the base plate surface is 1.5 to 4.0 mm.

[8] The resin molded body with a hook-and-loop fastener as set forth in any one of [2] and [4] to [7] above, wherein a ratio of an interval (mm) between the stem portions to a thickness (mm) of the stem portions is 0.30 to 0.80 times when a row direction of the male-type engaging elements is used as a reference.

[9] The resin molded body with a hook-and-loop fastener as set forth in any one of [1] to [8] above, wherein the thickness of the resin molded body is 1.0 to 50.0 mm, the resin molded body with a hook-and-loop fastener is formed by integrating the male-type molded hook-and-loop fastener having a smaller area than the resin molded body, and the end portion of the resin molded body and the end portion of the male-type molded hook-and-loop fastener are not in contact with each other and the distance between the end portions is at least 5 mm or more.

[10] The resin molded body with a hook-and-loop fastener as set forth in any one of [1] to [9] above, wherein the base plate, the male-type engaging element, and the embedded element are formed of the same resin composition, and the base plate is composed of a single layer.

[11] A method for producing the resin molded body with a hook-and-loop fastener as set forth in any one of [1] to [10] above, the method including the steps of: inserting the male-type molded hook-and-loop fastener into a male-type molded hook-and-loop fastener accommodating concave portion in a die; and injecting a non-foamable resin liquid into the die to integrate the male-type molded hook-and-loop fastener and the resin molded body.

[12] The method for producing a resin molded body with a hook-and-loop fastener as set forth in [11] above, wherein a die having a male-type engaging element accommodating concave portion in the male-type molded hook-and-loop fastener accommodating concave portion is used.

[13] A method for fixing a ceiling material for automobiles to a vehicle body, the method including: attaching the resin molded body with a hook-and-loop fastener as set forth in any one of [1] to [11] above to a back surface of the ceiling material for automobiles by any one of a method of attaching using an attaching tool and a method of attaching by adhesion using a hot melt resin; and then engaging a female-type hook-and-loop fastener attached to a vehicle body main body with a male-type molded hook-and-loop fastener of the resin molded body with a hook-and-loop fastener.

Advantageous Effects of Invention

According to the present invention, it is possible to provide a resin molded body with a hook-and-loop fastener having an excellent engaging force and a method for producing the resin molded body.

Further, according to the present invention, it is possible to provide a method for fixing a ceiling material for automobiles to a vehicle body, which has an adhesive force for a long period of time even under high temperature or low temperature conditions, is excellent in productivity, and does not cause a problem such as falling of a male-type engaging element even when a hot melt adhesive is used.

BRIEF DESCRIPTION OF DRAWINGS

FIG. 1 is a perspective view schematically showing an example of the resin molded body with a hook-and-loop fastener of the present invention.

FIG. 2 is a cross-sectional view schematically showing an example of the resin molded body with a hook-and-loop fastener of the present invention.

FIG. 3 is a perspective view schematically showing an example of a male-type engaging element provided on a surface of the resin molded body with a hook-and-loop fastener of the present invention.

FIG. 4 is a cross-sectional view schematically showing another example of the resin molded body with a hook-and-loop fastener of the present invention.

FIG. 5 is a cross-sectional view schematically showing a die having a male-type engaging element accommodating concave portion.

FIG. 6 is a cross-sectional view schematically showing another embodiment of a die having a male-type engaging element accommodating concave portion.

DESCRIPTION OF EMBODIMENTS

[Resin Molded Body with Hook-and-Loop Fastener]

The resin molded body with a hook-and-loop fastener of the present invention is a resin molded body with a hook-and-loop fastener, which is formed by integrating a non-foamed resin molded body and a male-type molded hook-and-loop fastener, wherein the male-type molded hook-and-loop fastener has at least a base plate, a plurality of male-type engaging elements rising from a front surface of the base plate, and a plurality of embedded elements rising from a rear surface of the base plate, wherein a resin constituting the male-type molded hook-and-loop fastener is at least one selected from polyester elastomer and polyamide, and the resin molded body and the male-type molded hook-and-loop fastener are integrated by embedding at least a part of the embedded elements in the resin molded body.

Hereinafter, an example of the resin molded body with a hook-and-loop fastener of the present invention will be described in detail with reference to the drawings. FIG. 1 is a perspective view schematically showing an example of the resin molded body with a hook-and-loop fastener of the present invention, and FIG. 2 is a schematic cross-sectional view of the male-type molded hook-and-loop fastener of FIG. 1 as viewed from the arrow direction shown in FIG. 1 (i.e., a schematic cross-sectional view as viewed from the row direction of the male-type engaging elements). FIG. 3 is a schematic view of a portion of the resin molded body with a hook-and-loop fastener in which a male-type engaging element is present, as viewed from obliquely above.

As shown in FIG. 1, the resin molded body with a hook-and-loop fastener of the present invention has a male-type molded hook-and-loop fastener (1) and a non-foamed resin molded body (2) integrated with the back surface side of the male-type molded hook-and-loop fastener (1).

The embodiment shown in FIG. 2 and FIG. 3 has a base plate (4), a plurality of male-type engaging elements (3) rising from the front surface of the base plate (4), and a plurality of embedded elements (7) rising from the back surface of the base plate (4). In the description herein, the male-type engaging element (3) shown in FIG. 2 and FIG. 3 may be referred to as an "arrow-head type engaging element".

The arrow-head type engaging element has a stem portion (5) rising from the front surface of the base plate (4), and a protruding portion (6) protruding symmetrically from the stem portion in a direction crossing a row direction (10) of the male-type engaging element from the middle or the tip of the stem portion (5). In the present embodiment, the tip of the protruding portion (6) protrudes in a direction approaching the base plate (4).

Further, in the present invention, as shown in FIG. 2 and FIG. 3, it is preferable to have a ridge portion (8) formed in a ridge shape on the front surface of the base plate (4), and it is preferable that the stem portion (5) rises from the ridge portion (8). When the base plate (4) has the ridge portion (8), the ridge portion (8) is included and referred to as the base plate surface.

Hereinafter, each configuration of the resin molded body with a hook-and-loop fastener of the present invention will be described in detail.

<Male-type Molded Hook-and-Loop Fastener (1)>

As shown in FIG. 2 and FIG. 3, the male-type molded hook-and-loop fastener (1) has at least a base plate (4), a plurality of male-type engaging elements (3) rising from the front surface of the base plate (4), and a plurality of embedded elements (7) rising from the back surface of the base plate (4).

The male-type molded hook-and-loop fastener is preferably formed of a resin composition containing at least one resin selected from a polyester elastomer and a polyamide, and above all, a resin composition containing a polyester elastomer is more preferable.

The polyester elastomer is preferably obtained by copolymerizing a resin having a butylene terephthalate unit as a main repeating unit with polyoxytetramethylene glycol. The polyester elastomer is preferable in that it has sufficient properties of an elastic polymer despite having a high elastic modulus. More specifically, the male-type molded hook-and-loop fastener produced using the resin has a high engaging force with a female-type hook-and-loop fastener attached to a vehicle body for automobiles as an engaging counterpart, and a protruding portion (6) of the male-type engaging element is rarely torn off or a loop-shaped engaging element of the engaging counterpart is rarely cut by repeated engagement and peeling. Further, the male-type molded hook-and-loop fastener has such excellent properties that the male-type engaging element hardly falls down even when it is pressure bonded from above, and the engaging force hardly changes with respect to a temperature change.

The proportion of the [poly(oxytetramethylene)] terephthalate group in the polyester elastomer used in the present invention is preferably 40 to 70% by mass, and more preferably 50 to 60% by mass. When the proportion of the [poly(oxytetramethylene)] terephthalate group is within the above range, the strength of the male-type molded hook-and-loop fastener can be improved while maintaining the flexibility.

The polyamide used in the present invention is preferably a semi-aromatic polyamide. In the present invention, polyamide is preferably used as a material of a male-type molded hook-and-loop fastener having an inverted J-shaped engaging element to be described later. The male-type engaging element formed of polyamide has high resilience, is hard to fall down, and is hard to break. Since the male-type engaging element formed of the semi-aromatic polyamide is particularly hard to fall down, the total thickness of the male-type molded hook-and-loop fastener (the sum of the thickness of the base plate and the height of the male-type engaging element) can be reduced.

The semi-aromatic polyamide is typically obtained from an aliphatic diamine and an aromatic dicarboxylic acid or a derivative thereof. Since the semi-aromatic polyamide is excellent in heat resistance and rigidity, it keeps high engagement strength even under a high temperature condition, so that it is suitable as an automobile member.

Examples of the aliphatic diamine forming the semi-aromatic polyamide include 1,6-hexanediamine, 1,8-octanediamine, 1,9-nonanediamine, 1,10-decanediamine, 1,11-undecanediamine, 1,12-dodecanediamine, 2-methyl-1,5-pentanediamine, 3-methyl-1,5-pentanediamine, 2,2,4-trimethyl-1,6-hexanediamine, 2,4,4-trimethyl-1,6-hexanediamine, 2-methyl-1,8-octanediamine, and 5-methyl-1,9-nonanediamine. 1,9-nonanediamine or a combination of 1,9-nonanediamine and 2-methyl-1,8-octanediamine is preferable from the viewpoints of falling prevention of the male-type engaging element and moldability.

In a case where 1,9-nonanediamine and 2-methyl-1,8-octanediamine are used in combination as the aliphatic diamine, the molar ratio of 1,9-nonanediamine:2-methyl-1,8-octanediamine is preferably 40:60 to 95:5 from the viewpoints of falling prevention of the male-type engaging element and engaging force.

As for the aromatic dicarboxylic acid that forms the semi-aromatic polyamide, an aromatic dicarboxylic acid mainly composed of terephthalic acid is preferable from the viewpoints of falling prevention of the male-type engaging element, moldability, and engaging force, and it is most preferable that all of the aromatic dicarboxylic acid is terephthalic acid.

Since the semi-aromatic polyamide is an extremely rigid resin, when the resin is pulled out from a cavity in a molding method of an inverted J-shaped engaging element to be described later, the male-type engaging element is easily cut, and a crack is easily generated particularly at a bent portion of the male-type engaging element. In order to prevent this, it is preferable to add a small amount of elastomer to the semi-aromatic polyamide.

Although a resin other than the polyester elastomer and the polyamide may be blended in the resin composition for forming the male-type molded hook-and-loop fastener, the total content of the polyester elastomer and the polyamide in the total of the "resin" is preferably 60% by mass or more, more preferably 80% by mass or more, still more preferably 90% by mass or more, and yet still more preferably substantially 100% by mass.

The content of the resin in the resin composition constituting the male-type molded hook-and-loop fastener is preferably 80 to 99.9% by mass, more preferably 85 to 99.9% by mass, and still more preferably 90 to 99.9% by mass. When the content of the resin in the resin composition constituting the male-type molded hook-and-loop fastener is within the above range, a male-type molded hook-and-loop fastener having an excellent engaging force can be obtained.

The resin composition constituting the male-type molded hook-and-loop fastener may contain additives such as various stabilizers, flame retardants, coloring agents, and fillers, and among them, it is preferable that a coloring agent is added. The resin composition constituting a resin molded body (2) described later generally contains a filler or the like in order to increase strength, and thus the resin molded body (2) has a white or gray color tone. Therefore, the male-type molded hook-and-loop fastener preferably has a color tone different from that of the resin molded body (2), and specifically, is preferably colored black, green, blue, brown, or the like. If the male-type molded hook-and-loop fastener (1) is colored, when the male-type molded hook-and-loop fastener attached to the back surface of the ceiling material for automobiles and the female-type molded hook-and-loop fastener attached to the vehicle body are engaged with each other, alignment becomes easy, and erroneous attachment is easily prevented.

When the resin composition constituting the male-type molded hook-and-loop fastener contains an additive, the content thereof is preferably 0.01 to 3.0% by mass, and more preferably 0.1 to 1.5% by mass. When the content of the additive is within the above range, the effect of the additive can be sufficiently obtained, and in particular, when the additive is a coloring agent, the male-type molded hook-and-loop fastener can be sufficiently colored.

<Resin Molded Body (2)>

The resin molded body (2) constituting the present invention is a non-foamed resin molded body and is integrated with the male-type molded hook-and-loop fastener (1).

Examples of a non-foamable resin constituting the resin molded body (2) include at least one general-purpose hard resin selected from polypropylene, polystyrene, an ABS resin, a polyamide resin, and the like. These resins are preferable in that a plastic plate having such a degree of hardness as not to be dented at all even when pressed with fingers can be obtained. Among these resins, polypropylene or an ABS resin is more preferable as the non-foamable resin. On the other hand, a foamable resin such as a polyurethane resin is difficult to be used in the present invention because it is difficult to fit and fix the resin molded body into an attaching tool fixed at a predetermined position on the back surface of a ceiling material for automobiles or to firmly attach the resin molded body with a hot melt adhesive.

The resin molded body (2) can be easily produced by insert-molding a resin composition containing the non-foamable resin as described later.

The resin composition constituting the resin molded body (2) may contain additives such as fillers, various stabilizers, flame retardants, and coloring agents in addition to the non-foamable hard resin.

When the resin composition constituting the resin molded body (2) contains an additive, the content thereof is preferably 10 to 65% by mass, more preferably 20 to 55% by mass, and still more preferably 20 to 50% by mass.

The thickness of the resin molded body (2) is preferably 1.0 to 50.0 mm, more preferably 1.5 to 30.0 mm, and still more preferably 2.0 to 20.0 mm. When the thickness of the resin molded body is within the above range, it is possible to prevent heat generated when the resin molded body is fixed to a ceiling material for automobiles with a hot melt adhesive from adversely affecting the male-type engaging element of the male-type molded hook-and-loop fastener present on the side opposite to the resin molded body (2). In addition, when the resin molded body is fitted into an attaching tool fixed to a predetermined position on the back surface of the ceiling material for automobiles, the resin molded body can be prevented from being easily detached.

Since the distance between the vehicle body and the ceiling material is not uniform, it is preferable that the thickness of the resin molded body (2) is appropriately adjusted according to the distance. By appropriately adjusting the thickness, the vehicle body and the ceiling material can be brought into close contact with each other, and thus can be more strongly engaged with each other.

In the present invention, it is preferable that the male-type molded hook-and-loop fastener having a smaller area than the resin-molded body is integrated with the resin-molded body having a thickness of 1.0 to 50.0 mm, and it is more preferable that an end portion of the resin-molded body and an end portion of the male-type molded hook-and-loop fastener are not in contact with each other, and the distance between the end portions is at least 5 mm or more.

Specifically, as shown in FIG. 1, it is preferable that a male-type molded hook-and-loop fastener is integrated with a substantially central portion of the resin molded body, and a region of the resin molded body in which the male-type molded hook-and-loop fastener is not integrated exists around the integrated male-type molded hook-and-loop fastener. By providing the region, the resin molded body with a hook-and-loop fastener of the present invention can be easily attached to the back surface of a ceiling material for automobiles. In addition, it is preferable that the region is wider because an adhesion area with the ceiling material for automobiles becomes larger. The region where the resin-molded body (2) is exposed (the distances between the end portions) is preferably 5 to 50 mm around the male-type molded hook-and-loop fastener, and more preferably 8 to 20 mm.

<Male-type Engaging Element (3)>

The male-type engaging element (3) constituting the present invention is intended to engage with a female-type engaging element to be engaged, and preferably has a stem portion (5) rising from the base plate and a protruding portion (6) protruding from the stem portion (5), for example, as shown in FIG. 2 and FIG. 3, and it is preferable that the protruding portion (6) protrudes from a middle or a tip of the stem portion (5) and the tip of the protruding portion (6) is inclined in a direction of the base plate.

In the present invention, as will be described later, it is preferable to integrally produce the male-type engaging element (3) and the male-type molded hook-and-loop fastener.

The density (engaging element density) of the male-type engaging elements (3) formed on a base plate (4), to be described later, is preferably 30 to 70 elements/cm$^2$, and more preferably 40 to 60 elements/cm$^2$. When the engaging element density is within the above range, a sufficient engaging force can be obtained.

Here, the "density of the male-type engaging elements" means the number (number of elements) of engaging elements present per unit area (1 cm$^2$) when the male-type molded hook-and-loop fastener is viewed from directly above.

The height of the male-type engaging element from the surface of the base plate is preferably 1.5 to 4.0 mm, more preferably 2.2 to 3.5 mm, and still more preferably 2.2 to 2.8 mm. When the height of the male-type engaging element from the surface of the base plate is within the above range, a good balance between the engaging force and the difficulty of falling of the male-type engaging element is achieved.

Further, the thickness of the male-type engaging element (thicknesses in the row direction of the male-type engaging element) is preferably 0.2 to 1.0 mm, and more preferably 0.3 to 0.8 mm. When the thickness of the male-type engaging element is within the above range, the strength of the male-type engaging element becomes sufficient, and the male-type engaging element hardly falls down.

In the male-type molded hook-and-loop fastener shown in FIG. 2 and FIG. 3, a sticking preventing projection (9) is provided at the tip portion of the stem portion (5), which will be described later.

<Base Plate (4)>

According to the present invention, there is provided a base plate (4) for supporting a male-type engaging element (3) and an embedded element (7). The base plate (4) has a thickness of preferably 0.05 to 0.50 mm, more preferably 0.10 to 0.40 mm, and still more preferably 0.15 to 0.35 mm. When the thickness of the base plate (4) is within the above range, it is preferable because the strength of the base plate (4) becomes sufficient and the base plate (4) does not become too thick.

In the present invention, as will be described later, the base plate (4) is also preferably produced integrally with the male-type molded hook-and-loop fastener.

<Stem Portion (5) and Protruding Portion (6)>

The stem portion (5) is provided so as to rise from the surface of the base plate (4), and more specifically, as shown in FIG. 2 and FIG. 3, it is preferable that the stem portion (5) is provided so as to rise from a ridge portion (8) formed in a ridge shape on the surface of the base plate (4). When the base plate (4) has a ridge portion (8) and the stem portion (5) is provided so as to rise from the ridge portion (8), the stem portion can be prevented from being affected by heat generated when the male-type molded hook-and-loop fastener (1) and the resin molded body (2) are integrally molded, and heat dissipation can be improved by increasing the surface area of the base plate. As a result, it is possible to prevent the male-type engaging elements from being softened by heat during production, and thus it is possible to prevent the male-type engaging elements from falling down due to pressure during molding.

In the present invention, the height of the stem portion (5) is preferably 1.5 to 4.0 mm, more preferably 2.0 to 3.0 mm, and still more preferably 2.2 to 2.8 mm. When the height of the stem portion (5) is within the above range, the configuration of the engaging element for obtaining desired performance and function can be easily studied, and hook cutting can be easily performed even in the production process of the male-type molded hook-and-loop fastener, thereby stabilizing the engaging performance.

The protruding portion (6) is provided in the middle or at the tip of the stem portion (5), and by providing the protruding portion (6), the engaging force is further improved. As shown in FIG. 2, it is preferable that two or more protruding portions (6) are provided in the vertical direction of the stem portion (5). In a case where two or more protruding portions are provided in the vertical direction, it is possible to prevent a lateral shift from occurring between the male-type engaging element and the engaging counterpart after engagement (that is, it is possible to suppress a shift in a direction in which the male-type engaging elements are continuous with the row). If the number of the protruding portions (6) provided in the vertical direction is too large, the male-type engaging element is likely to fall down. Therefore, the number of the protruding portions (6) provided in the vertical direction is preferably two or three, and more preferably two.

As shown in FIG. 2, the protruding portions (6) are preferably provided bilaterally symmetrically with respect to the stem portion. More specifically, the protruding portions (6) are preferably provided in a direction substantially orthogonal to both the direction in which the male-type engaging elements (3) are formed in rows and the rising direction of the male-type engaging elements, so as to be bilaterally symmetrical with respect to the stem portion (5), and more preferably have four or more protruding portions (6) in total. With such a configuration, the loop-shaped engaging element of the engaging counterpart is less likely to be cut or the engaging counterpart is less likely to be split.

Note that the term "substantially orthogonal" refers to an angle of about 90°±45°, preferably about 90°±20° with respect to the row direction. In addition, symmetry means that in a pair of protruding portions protruding from the stem portion, the maximum width in the height direction of the stem portion in one protruding portion is preferably 80 to 120%, and more preferably 90 to 110% of the maximum width in the height direction of the stem portion in the other protruding portion, the maximum height from the surface of the base plate at the position of the base of one protruding portion with the stem portion is preferably 80 to 120%, and more preferably 90 to 110% of the maximum height from the surface of the base plate at the position of the base of the other protruding portion with the stem portion, and the length of protrusion from the stem portion in one protruding portion is preferably 80 to 120%, and more preferably 90 to 110% of the length of protrusion from the stem portion in the other protruding portion.

When a plurality of the protruding portions (6) are provided in the vertical direction, it is preferable that the length of the protruding portion provided at the upper portion is shorter than the length of the protruding portion provided at the lower portion. By making the length of the protruding portion provided at the upper portion shorter than the length of the protruding portion provided at the lower portion, the protruding portion provided at the lower portion can be made to function more efficiently and the engaging force can be improved.

More specifically, in the case where two protruding portions (6) are provided in the vertical direction, the length of the protruding portion provided at the upper portion is preferably 0.15 to 0.40 mm, more preferably 0.20 to 0.35 mm, and still more preferably 0.20 to 0.30 mm. In addition, the length of the protruding portion provided at the lower portion is preferably 0.20 to 0.45 mm, more preferably 0.25 to 0.45 mm, and still more preferably 0.30 to 0.35 mm. By adjusting the length of each protruding portion within the above range, the engaging force of the protruding portion (6) provided at the lower portion can be effectively utilized.

In the present embodiment, the tip of the protruding portion (6) protrudes in a direction approaching the base plate (4). By protruding the tip of the protruding portion (6) in the direction approaching the base plate (4), the engaging force is further improved.

<Embedded Element (7)>

In the embedded element (7) provided on the back surface of the male-type molded hook-and-loop fastener (the surface opposite to the surface on which the male-type molded engaging element is present), at least a part of the embedded element (7) is embedded in the resin molded body, so that the resin molded body and the male-type molded hook-and-loop fastener can be integrated.

As shown in FIG. 2, it is preferable that the embedded element (7) rises from the back surface of the base plate (4) and has a bulge at the tip portion thereof. By having the bulge, the male-type molded hook-and-loop fastener is less likely to be detached from the resin molded body.

The height of the embedded element is preferably 10 to 50%, and more preferably 20 to 40%, of the height of the male-type engaging element present on the opposite surface. When the height of the embedded element is within the above range, the embedded element is sufficiently embedded in the resin molded body, and thus the male-type molded hook-and-loop fastener is less likely to be detached from the resin molded body.

<Ridge Portion (8)>

In the present invention, as described above, it is preferable to provide the ridge portion (8) for the purpose of suppressing the stem portion from being affected by heat generated when the male-type molded hook-and-loop fastener (1) and the resin molded body (2) are integrally molded. By providing the ridge portion (8), the surface area of the base plate can be increased, and the heat dissipation is improved. In addition, since it is possible to prevent the male-type engaging element from being softened by heat during production, it is also possible to prevent the male-type engaging element from falling down due to pressure during molding. It is preferable that the ridge portion is continuously present on the base plate in a row direction (the same direction as an extrusion direction of the male-type molded hook-and-loop fastener), and the male-type engaging element is formed on the ridge portion along the row direction.

The height of the ridge portion (8) is preferably 2 to 30%, and more preferably 10 to 25% of the height of the male-type engaging element. When the height of the ridge portion (8) is within the above range, it is possible to prevent the stem portion from being affected by heat generated when the male-type molded hook-and-loop fastener (1) and the resin molded body (2) are integrally molded.

It should be noted that the ridge portion (8) need not have a uniform height and may be lowered between male-type engaging elements, but are preferably continuous in the longitudinal direction.

<Sticking Preventing Projection (9)>

In the present invention, it is preferable that a sticking preventing projection (9) is provided at the tip of the stem portion of the male-type engaging element. The sticking preventing projection (9) is for preventing occurrence of unintended engagement when the ceiling material with the hook-and-loop fastener is brought close to an engaging counterpart for alignment when the ceiling material for automobiles is attached to a predetermined position of a vehicle body.

The height of the sticking preventing projection (9) is preferably 10 to 40%, and more preferably 20 to 35% of the height of the male-type engaging element. When the height of the sticking preventing projection (9) is within the above range, the above-described unintended engagement can be effectively suppressed.

It should be noted that the sticking preventing projection (9) does not have to be present on a head top portion of the stem portion of all the male-type engaging elements.

<Method for Producing Male-type Molded Hook-and-Loop Fastener>

Next, a method for producing the male-type molded hook-and-loop fastener constituting the present invention will be described. First, the resin composition for a male-type molded hook-and-loop fastener is melt-extruded from a nozzle having a slit similar to the cross-sectional shape shown in FIG. 2, and cooled to obtain a tape-shaped molded body having the cross-sectional shape. The width of the tape-shaped molded body is preferably 20 to 80 mm, and more preferably 30 to 60 mm.

In the tape-shaped molded body obtained by the above-described method, the male-type engaging elements are not independent from each other in the extrusion direction of the tape-shaped molded body, form a continuous convex portion for the male-type engaging elements (hereinafter, also referred to as a "male-type engaging element row").

The number of the male-type engaging element row present in the width direction of the tape-shaped molded body is preferably 3 to 8 rows, and more preferably 4 to 6 rows per 1 cm of the tape width after stretching.

In addition, the embedded elements also are not independent from each other in the extrusion direction of the tape-shaped molded body, and form a continuous convex portion for the embedded elements (hereinafter also referred to as an "embedded element row"). As shown in FIG. 2, the embedded element row is preferably provided between the male-type engaging element row and the adjacent male-type engaging element row on the back surface side of the base plate (4). It is preferable that the embedded element exists parallel to the extrusion direction of the tape-shaped molded body, as in the case of the male-type engaging element. With this arrangement, the tensile force applied to the male-type engaging element can be uniformly distributed to the resin molded body. Therefore, the number of the embedded element row is also preferably 3 to 8 rows, and more preferably 4 to 6 rows per 1 cm of the tape width after stretching. Preferably, the number of the embedded element row is the same as the number of the male-type engaging element row.

Next, in the male-type engaging element row, a cut portion is made in the width direction of the tape-shaped molded body (preferably in a direction substantially orthogonal to the longitudinal direction of each row) from the tip in the height direction of the row to the middle in the height direction thereof. It should be noted that the embedded element row may or may not be provided with a cut portion.

By making a cut portion in the male-type engaging element row not to the base of the row but to the middle, a lower part of the row where no cut portion is made becomes a ridge portion (8). As a result, the ridge portion (8) is continuously present in the extrusion direction of the tape-shaped molded body (the row direction of the male-type engaging elements).

The interval of the cut portions provided in the male-type engaging element row and the embedded element row as necessary is not particularly limited, but is preferably 0.20 to 0.60 mm, and more preferably 0.30 to 0.55 mm.

After the cut portions are made, the tape-shaped molded body is stretched in the longitudinal direction (extrusion direction of the tape-shaped molded body). As a result of the stretching, the cut portions formed in each row are widened to form a row of a large number of independent male-type engaging elements.

The stretching ratio (the ratio of the length of the tape-shaped molded body after stretching to the length of the tape-shaped molded body before stretching) is preferably 1.4 to 1.9 times, and more preferably 1.5 to 1.8 times. When the stretching ratio is in the above range, the ratio of the interval (mm) between the stem portions to the thickness (mm) of the stem portions is preferably 0.30 to 0.80 times, and more preferably 0.45 to 0.65 times, when the row direction of the male-type engaging elements is used as a reference. Since this interval is narrower than that of the conventional product, it is possible to suppress the occurrence of the problem that a loop-shaped engaging element is unevenly engaged with a specific male-type engaging element and the loop-shaped engaging element is cut or the male-type engaging element falls down.

Although the male-type molded hook-and-loop fastener can be easily produced by the method described above, the method is not limited to this method, and the male-type molded hook-and-loop fastener may be produced by other production methods.

As another production method, a method in which a hook-and-loop fastener having a male-type engaging element and a tape for an embedded element are separately molded and the hook-and-loop fastener and the tape for an embedded element are joined to each other is exemplified, but this method is not preferable because delamination occurs.

On the other hand, according to the above-described method, the base plate, the male-type engaging element, and the embedded element can be formed of the same resin composition, and since the base plate is composed of a single layer, a male-type molded hook-and-loop fastener can be obtained, so that the problem of delamination does not occur, which is also preferable from the viewpoint of productivity.

<Other Embodiments of Male-type Molded Hook-and-Loop Fastener>

In the present invention, as described above, the male-type molded hook-and-loop fastener of the embodiment shown in FIG. 2 is preferable, but a male-type molded hook-and-loop fastener of a different embodiment can also be adopted.

For example, as shown in FIG. 4, it is possible to employ a male-type engaging element (hereinafter sometimes referred to as "inverted J-shaped engaging element") that rises from the base plate, gradually tapers from the root to the tip without branching in the middle or at the tip portion, bends in the same direction as the row direction of the male-type engaging elements in the middle, and has a shape in which the tip approaches the surface of the base plate.

More specifically, the male-type molded hook-and-loop fastener having the inverted J-shaped engaging elements includes a base plate (24) and inverted J-shaped engaging elements (23) rising from the surface thereof, preferably from the surface of ridge portions (28) formed on the surface thereof, and the inverted J-shaped engaging elements are preferably arranged in rows (20). Also in FIG. 4, an embedded element is provided on the back surface side of the base plate (24).

Next, a method for producing the male-type molded hook-and-loop fastener having the inverted J-shaped engaging elements shown in FIG. 4 will be described.

For example, a method is used for producing a resin sheet having a large number of male-type engaging elements on the surface thereof by flowing a molten resin, preferably a molten polyamide, and more preferably a molten semi-aromatic polyamide in a sheet form on the surface of a metal roll having a large number of cavities in the shape of a male-type engaging element on the surface thereof, press-fitting the molten resin into the cavities, and after solidification, peeling the sheet from the metal roll surface and simultaneously pulling the male-type engaging element out of the cavities, thereby producing a resin sheet having a large number of male-type engaging elements on the surface thereof.

In the case of this production method, the embedded element on the back surface side of the base plate (24) can be provided by press-fitting the molten resin into a cavity provided on the metal roll surface in contact with the back surface of the molten resin sheet at the time of molding the male-type engaging element described above, and pulling out the embedded element from the cavity when the sheet is peeled off from the metal roll surface after solidification.

The method of pulling out from the cavity will now be described in more detail.

A ring-shaped die having a thickness of 0.2 to 0.5 mm in which a plurality of cavities having an inverted J-shaped shape are engraved along the outer circumferential direction thereof; a metal ring having no cavity engraved therein; a ring-shaped die having a thickness of 0.2 to 0.5 mm in which a plurality of cavities having an inverted J-shaped shape which is bent in a direction opposite to the above-described inverted J-shaped shape are engraved along the outer circumferential direction thereof; and a metal ring having no cavity engraved therein are successively superposed in this order to prepare a metal roll having a large number of cavities having an inverted J-shaped engaging element shape and a large number of cavities having an inverted J-shaped engaging element bent in the opposite direction thereof on the outer peripheral surface.

In the above-described metal roll, the ring-shaped die having an inverted J-shaped shape cavity and the ring-shaped die having an inverted J-shaped shape cavity facing the opposite direction are superposed one by one, but two or more may be superposed.

On the outer surface of the metal roll thus obtained, a plurality of cavities bent along the circumferential direction are arranged in a row in the circumferential direction. Further, there are a plurality of such rows in the width direction of the metal roll, and the bending direction of the cavities is reversed for each row or for each plurality of rows. The cavity is gradually tapered from the surface of the metal roll to the tip portion, and is gradually bent in the circumferential direction of the metal roll from the middle, and the tip portion faces in a direction approaching the surface of the metal roll.

A male-type molded hook-and-loop fastener can be obtained by flow molding a molten resin, for example, a molten polyamide, preferably a molten semi-aromatic polyamide, on the surface of a metal roll.

In the flow molding, the molten resin is extruded into a gap between a metal roll and another drum roll arranged in a position opposite to the metal roll and the molten resin is pressed to fill the cavity with the molten resin and to form a sheet of the molten resin having a uniform thickness on the surface of the roll, the molten resin in the cavity is cooled and solidified by a refrigerant constantly circulating in the roll while a metal roll is rotating, the base plate of the male-type molded hook-and-loop fastener from which the sheet of the molten resin is obtained is stretched to a uniform thickness by using a nip roller with an adjusted gap, the cooled and solidified sheet is peeled off from the surface of the metal roll, and the male-type engaging element is pulled out from the cavity.

Thus, a molded hook-and-loop fastener having a large number of male-type engaging elements on the surface thereof is obtained.

In the male-type molded hook-and-loop fastener having an inverted J-shaped engaging element, the male-type engaging element becomes thinner from the root to the tip portion (i.e., the base of the male-type engaging element is thick and becomes thinner toward the tip) and is gradually bent from the middle, the tip portion faces in a direction approaching the surface of the base plate, a plurality of male-type engaging elements that are bent in the same direction are arranged in a row in the bending direction, and one or more rows of male-type engaging elements and one or more rows of male-type engaging elements bent in the opposite direction are alternately arranged.

At the top portion of the inverted J-shaped engaging element, the width is preferably larger than the thickness. That is, as shown in FIG. 4, the width (W) at the top portion of the male-type engaging element is preferably larger than the thickness (S), i.e., W>S. By satisfying this, as described above, when the male-type molded hook-and-loop fastener is molded, it is possible to prevent the male-type engaging element from being cut when pulled out from the cavity and to prevent a crack from being formed in the bent portion of the male-type engaging element, and it is also possible to prevent the female-type engaging element which is an engaging counterpart from being cut together with the roundness of the male-type engaging element described above.

The height (H) of the inverted J-shaped engaging element from the front surface of the base plate is preferably 0.35 to 1.5 mm, and more preferably 0.6 to 1.3 mm, the spread (C) of the base portion is preferably 0.7 to 1.5 mm, and more preferably 0.8 to 1.3 mm, and the ratio of C/H is preferably 0.6 to 1.2, and more preferably 0.65 to 1.0. As described above, it is preferable that the base of the inverted J-shaped engaging element is thick, the tip thereof is thin, and the height thereof is low from the viewpoint of difficulty of falling of the inverted J-shaped engaging element and further from the viewpoint of engaging force.

In addition, it is preferable that the spread (D) at the position of ⅔ of the height (H) from the base is 0.15 to 0.4 mm, and the inverted J-shaped engaging element starts to gradually bend from the vicinity of ½ to ¾ of the height from the base.

Further, the width (W) at the top portion of the male-type engaging element shown in FIG. 4 is preferably 0.2 to 0.4 mm. The width (W) may be the same from the base to the tip portion of the male-type engaging element, or may be gradually tapered toward the tip portion. For example, when the above-described ring-shaped die is used, the width (W) is inevitably substantially the same from the base to the tip portion.

The thickness (S) at the top portion of the male-type engaging element is preferably 0.15 to 0.35 mm and less than the width (W).

In the male-type molded hook-and-loop fastener shown in FIG. 4, the individual male-type engaging elements are not branched on the way to the tip portion or at the tip. This prevents the male-type engaging element from being cut when it is pulled out from the cavity.

As described above, the base plate of the male-type molded hook-and-loop fastener having an inverted J-shaped engaging element preferably has a thickness (T) of 0.1 to 0.3 mm in terms of flexibility and strength along a curved surface. The density of the inverted J-shaped engaging elements present on the base plate is preferably 60 to 160 elements/cm$^2$, and especially more preferably 80 to 140 elements/cm$^2$.

In the male-type molded hook-and-loop fastener having the inverted J-shaped engaging elements, as shown in FIG. 4, a plurality of male-type engaging elements bent in the same direction are arranged in a row in the same direction as the bending direction. Further, a plurality of male-type engaging elements bent in the opposite direction may be arranged in another row in the same direction as the bending direction.

The interval (E) between two adjacent male-type engaging elements in the same row is preferably 1.2 to 2.2 mm, and more preferably 1.3 to 1.8 mm. That is, the male-type engaging elements are preferably present at a proportion of one element in 1.2 to 2.2 mm in the row direction, and more preferably at a proportion of one element in 1.3 to 1.8 mm.

The interval between two adjacent engaging element rows is preferably 0.4 to 1.0 mm, and more preferably 0.5 to 0.8 mm. That is, the rows of male-type engaging elements are preferably present in one row in a width of 0.4 to 1.0 mm of the base plate, and more preferably in one row in a width of 0.5 to 0.8 mm of the base plate.

[Production Method of Resin Molded Body with Hook-and-Loop fastener of the Present Invention]

Next, a method for producing a resin molded body with a hook-and-loop fastener of the present invention will be described.

The method for producing the resin molded body with a hook-and-loop fastener of the present invention includes a step of inserting a male-type molding hook-and-loop fastener into a male-type molding hook-and-loop fastener accommodating concave portion in a die, and a step of injecting a non-foamable resin liquid into the die to integrate the male-type molding hook-and-loop fastener and the resin molded body.

In the present invention, it is preferable that a concave portion having the same size as the base plate of the male-type molded hook-and-loop fastener (hereinafter referred to as "male-type molded hook-and-loop fastener accommodating concave portion") is provided in the die, the male-type molded hook-and-loop fastener is inserted into the male-type molded hook-and-loop fastener accommodating concave portion, a non-foamable resin liquid is injected into the die, and the resin liquid is further cooled and solidified (it is preferable to produce by a so-called insert molding method). With such a production method, the surface of the male-type molded hook-and-loop fastener on which the embedded element is present and the non-foamable resin liquid are in contact with each other. As a result, the embedded element is embedded in the non-foamable resin, and the male-type molded hook-and-loop fastener and the resin molded body can be integrated with each other. In the case of producing by this insert molding method, even when the non-foaming resin to be used does not have affinity with the resin forming the male-type molded hook-and-loop fastener, physically strong bonding can be achieved.

In the production method of the present invention, after the surface of the male-type molded hook-and-loop fastener on which the male-type engaging elements are present is disposed so as to be in contact with the concave portion of the die, a non-foamable resin liquid is injected into the die. In this case, the resin liquid flows into the concave portion, and the male-type engaging element is covered with the resin. As a result, the engaging force may be lost. Therefore, in order to suppress this, it is preferable that the male-type engaging elements are covered with a covering material such as silicone rubber, water-soluble resin, film, or nonwoven fabric before the male-type molded hook-and-loop fastener is disposed in the die.

As another method of protecting the male-type engaging elements, there is a method of providing concave portions (32) for accommodating the male-type engaging elements as shown in FIG. 5 at positions corresponding to rows of the male-type engaging elements of the male-type molded hook-and-loop fastener among the male-type molded hook-and-loop fastener accommodating concave portions, that is, a method of using a die having the male-type engaging element accommodating concave portions (32) in the male-type molded hook-and-loop fastener accommodating concave portions. By providing the male-type engaging element accommodating concave portion (32), when the male-type molded hook-and-loop fastener (1) is accommodated in the die (31), it is possible to produce the resin molded body while preventing a problem such as bending of the male-type engaging element. In FIG. 5, the size of the male-type engaging element accommodating concave portion (32) is the same as the width of one row of male-type engaging elements formed on the male-type molded hook-and-loop fastener (1). In the case of the embodiment shown in FIG. 5, it becomes easy to suppress collapse of the male-type engaging element in the production process, adhesion of the resin composition constituting the resin molded body to the male-type engaging element, positional deviation of the male-type engaging element with respect to the die (31), and the like.

On the other hand, as shown in FIG. 6, the size of the male-type engaging element accommodating concave portion (32) may be the same as the width of two rows of male-type engaging elements formed on the male-type molded hook-and-loop fastener (1). In the case of the embodiment shown in FIG. 6, each male-type engaging element can be easily inserted into the male-type engaging element accommodating concave portion (32), so that productivity is improved. Further, similarly to the die shown in FIG. 5, it is also possible to prevent the resin composition constituting the resin molded body from adhering to the male-type engaging elements.

Note that a conventional general method is a method in which a foamable resin liquid is poured into a die in a state where a male-type molded hook-and-loop fastener is set in the die, the resin is foamed, and the male-type molded hook-and-loop fastener is attached to a surface of a foamed molded body. However, in the present invention, a method of pouring a non-foamable resin is adopted unlike such a widely performed method.

It should be noted that JP 4-91105 U discloses that a molded member with a hook-and-loop fastener is obtained by injection-molding a synthetic resin on the back surface of the hook-and-loop fastener with the engaging element surface of the hook-and-loop fastener facing outward. However, although the publication describes that the hook-and-loop fastener may be either a woven fabric hook-and-loop fastener or a molded hook-and-loop fastener, there is no description about a male-type molded hook-and-loop fastener in which male-type engaging elements of the hook-and-loop fastener have a stem portion rising from a base plate and a protruding portion protruding symmetrically from the stem portion in a direction intersecting with the row direction of the male-type engaging elements from the middle or the tip thereof and the tip of which approaches the base plate surface. Further, with respect to the molded member with a hook-and-loop fastener thus obtained, although it is described in the same publication that a non-foamable resin may be used, it is specified that a foamed molded body excellent in flexibility and cushioning properties is preferable. That is, the technique described in the publication is intended to obtain a cushion molded body such as an automobile seat or a sofa, and there is no description of a non-foamed resin molded body with a hook-and-loop fastener used for fixing a ceiling material for automobiles.

[Method of Fixing Ceiling Material for Automobile to Vehicle Body]

A method for fixing a ceiling material for automobiles to a vehicle body of the present invention is a method including attaching the resin molded body with a hook-and-loop fastener according to the present invention to a back surface of the ceiling material for automobiles by any one of a method of attaching using an attaching tool and a method of attaching by adhesion using a hot melt resin, and then engaging a female-type hook-and-loop fastener attached to a vehicle body main body with a male-type molded hook-and-loop fastener of the resin molded body with a hook-and-loop fastener.

As the ceiling material for automobiles, those generally used can be used. Examples thereof include a sheet in which a non-woven fabric, a glass fiber mat, and a foamed resin layer, a pile fabric, a woven or knitted fabric, a natural or artificial leather, or the like are laminated, and a non-woven fabric layer is preferably present on the back surface side.

It is preferable that a metal or resin attaching tool is fixed at a predetermined position on the back surface of the ceiling material for automobiles so that the resin molded body with the hook-and-loop fastener can be mounted. Accordingly, the resin molded body with the hook-and-loop fastener of the present invention can be easily fixed to the back surface of the ceiling material for automobiles by sliding and fitting the resin molded body with the hook-and-loop fastener to the attaching tool so that the male-type molded hook-and-loop fastener is on the outside. In the case of fixing with an attaching tool, unlike the case of using an adhesive, curing is not necessary, so that productivity is excellent, and further, since a solvent is not used, work environment is not deteriorated.

Further, in the present invention, the resin molded body with a hook-and-loop fastener may be attached to a predetermined position of a ceiling material for automobiles using a hot melt adhesive.

The hot melt adhesive may be a non-woven fabric made of a hot melt resin, or may be a film made of a hot melt resin. Of course, it is also possible to apply a melt, solution or dispersion of a hot-melt resin.

As a more specific hot melt adhesive, a hot melt adhesive capable of obtaining an adhesive force can be appropriately selected depending on the type of fibers on the back surface of the ceiling material for automobiles and the type of resin molded body constituting the resin molded body with a hook-and-loop fastener, but a reactive hot melt adhesive that can be cured by moisture to provide a strong adhesive force is preferable, and a urethane-based reactive hot melt adhesive is more preferable.

The ceiling material for automobiles with the hook-and-loop fastener thus obtained can be fixed to the vehicle body by engaging with the female-type hook-and-loop fastener attached to the vehicle body main body.

EXAMPLES

The present invention will be specifically described below with reference to Examples and Comparative Examples. As for the engaging force of the male-type molded hook-and-loop fastener, the initial engaging forces at normal temperature (20° C.) and 115° C. were measured according to the method of JIS L3416:2000. A polyester woven hook-and-loop fastener ["MAGIC TAPE (registered trademark) B9750Y.00" manufactured by Kuraray Fastening Co., Ltd.] was used as a loop-shaped engaging element serving as an engaging counterpart in this case.

Example 1

A polyester elastomer ("Hytrel" (registered trademark) 6377 manufactured by Du Pont-Toray Co., Ltd.) was extruded using a nozzle having the same cross-sectional shape as that of FIG. 2, and cooled to form a tape-shaped molded body. The tape-shaped molded body had a plurality of male-type engaging element rows continuous in the longitudinal direction of the tape on the front surface and embedded element rows on the back surface. The number of the male-type engaging element row was five rows per 1 cm of the tape width. Further, the number of the embedded element row was also five rows per 1 cm of the tape width.

Then, with respect to the male-type engaging element row, cut portions were made at intervals of 0.5 mm in a direction substantially orthogonal to the longitudinal direction of the row from the tip in the height direction of the row to the position of 4/5 (from the bottom to 1/5) of the height of the row. Next, the tape-shaped molded body was stretched 1.6 times in the longitudinal direction.

The resulting tape-shaped molded body had the shape shown in FIG. 2, and specifically, on the base plate (4) made of a polyester elastomer, rows for the male-type engaging elements (3) having two protruding portions in the vertical direction, also made of a polyester elastomer, had risen. Further, from the back surface of the base plate (4) (the surface opposite to the surface on which the male-type engaging elements (3) are provided), rows for the embedded elements (7) had risen at positions located between the male-type engaging element rows.

The width of the obtained tape-shaped molded body was 40 mm. To the composition containing the polyester elastomer used in the molding, a green organic pigment was added at a proportion of 1.0% by mass in the composition.

As shown in FIG. 2, the obtained male-type molded hook-and-loop fastener had a base plate, male-type engaging elements rising from the front surface thereof, and embedded elements rising from the back surface thereof. Further, the male-type engaging element had a stem portion rising from the base plate, and a protruding portion protruding from the middle or the tip thereof in a direction substantially perpendicular to the row direction of the male-type engaging element and symmetrically from the stem portion. Furthermore, the tip of the protruding portion was close to the base plate surface, and two protruding portions were provided in the vertical direction of the stem portion. In addition, the obtained male-type molded hook-and-loop fastener had a bright green color. On the back surface side of the base plate between two adjacent rows of male-type engaging elements, a row of embedded elements is present parallel to the row of male-type engaging elements.

The thickness of the base plate of the obtained tape-shaped molded body was 0.3 mm, the height (H) of the male-type engaging elements from the base plate surface was 2.4 mm, and the thickness of the male-type engaging elements (in the extrusion direction of the tape-shaped molded body [the row direction of the male-type engaging elements]) was 0.54 mm. Further, when the row direction of the male-type engaging elements is used as a reference, the ratio of the interval (mm) between the stem portions to the thickness (mm) of the stem portions was 0.61 times, and the density of the male-type engaging elements in the portion where the male-type engaging elements were present was 51.2 elements/cm$^2$.

In the obtained tape-shaped molded body, of the two protruding portions provided in the vertical direction of the male-type engaging element, the protruding portion present in the lower portion (the protruding portion provided on the base plate (4) side) was longer than the protruding portion present in the upper portion, and the protruding length of the protruding portion present in the upper portion was 0.29 mm, and the protruding length of the protruding portion present in the lower portion was 0.34 mm. Further, as shown in FIG. 2, a projection for preventing sticking was present at the tip of the stem portion, and the length thereof was 21.1% of the height of the male-type engaging element.

In addition, as shown in FIG. 2 and FIG. 3, a ridge portion having a height of 0.57 mm (about 23% of the height of the male-type engaging element) continuously extending in the row direction of the engaging elements was present on the surface of the base plate, and the male-type engaging elements had risen from the ridge portion. Further, the male-type engaging element is formed along the ridge of the ridge portion. Furthermore, the height of the embedded element present on the back surface of the base plate was 0.78 mm (about 32% of the height of the male-type engaging element), and an expanded head portion was provided at the tip portion thereof as shown in FIG. 2.

The male-type molded hook-and-loop fastener thus obtained was cut into pieces having a length of 20 mm and a width of 40 mm in the male-type engaging element row direction. Next, the male-type engaging element of the male-type molded hook-and-loop fastener was inserted without a gap so as to be accommodated in a male-type engaging element accommodating concave portion provided in a male-type molded hook-and-loop fastener accommodating concave portion in a die. Next, a melt of polypropylene containing 40% by mass of talc as a filler (melt of the resin composition constituting the resin molded body (2)) was injected into the die, cooled, and then taken out from the die.

The male-type engaging element accommodating concave portion had the same width as one row of the male-type engaging elements formed on the male-type molded hook-and-loop fastener.

The obtained resin molded body with a hook-and-loop fastener was a resin molded body with a hook-and-loop fastener in which a male-type molded hook-and-loop fastener was integrated into the central surface of a resin molded body made of polypropylene having a thickness of 2.5 mm with the male-type engaging elements on the outside. Around the male-type molded hook-and-loop fastener, a region having a width of 10 mm (a region adjacent to a side having a length of 20 mm of the male-type molded hook-and-loop fastener) and a region having a width of 15 mm (a region adjacent to a side having a length of 40 mm of the male-type molded hook-and-loop fastener), in which the resin molded body is exposed without the male-type molded hook-and-loop fastener being integrated, were present so as to surround the male-type molded hook-and-loop fastener. Further, in the obtained resin molded body with a hook-and-loop fastener, the resin molded body portion (polypropylene plate) was milky white, and the male-type molded hook-and-loop fastener portion was bright green.

Next, the obtained resin molded body with a hook-and-loop fastener was attached to a ceiling material for automobiles by being fitted into a polypropylene attaching tool fixed to the back surface of the ceiling material for automobiles.

The ceiling material for automobiles used was obtained by covering both surfaces of a layer made of foamed polyurethane having a thickness of 8 mm with a glass fiber mat (basis weight: 100 mm/m$^2$) impregnated with a thermosetting isocyanate compound, and further covering one surface (referred to as a front surface side surface) with an artificial leather, a soft foamed polyurethane layer, and an entangled non-woven fabric made of polyester fibers in this order. In addition, with respect to the surface opposite to the front surface side surface (referred to as the back surface side surface), a laminated film having a hot-melt polyolefin layer on both sides of a polypropylene layer having a thickness of 1 mm and an entangled non-woven fabric made of polyester fibers and having a thickness of 1 mm are laminated so that the entangled non-woven fabric side is on the outside.

From the ceiling material for automobiles having a resin molded body with a hook-and-loop fastener prepared by the above method, a portion to which the resin molded body with a hook-and-loop fastener was attached was cut out and engaged with the polyester woven hook-and-loop fastener, and the initial engaging force at normal temperature (20° C.) and 115° C. was measured. The results are shown in the following Table 1. In addition, the engaging force was measured after repeating engagement and peeling five times at normal temperature (20° C.). The results are shown in the following Table 2.

Example 2

The resin molded body with a hook-and-loop fastener produced in Example 1 was attached to the back surface of a ceiling material for automobiles similar to that used in Example 1 by adhesion using a hot melt resin (olefin-based reactive hot melt adhesive [Hi-Bon 9955 manufactured by Hitachi Kasei Polymer Co., Ltd.]).

Specifically, using an olefin-based hot melt adhesive, a hot melt resin liquid melted at 200° C. was applied to the surface of the resin molded body with a hook-and-loop fastener opposite to the surface on which the male-type molded hook-and-loop fastener was present, and the resin molded body was attached to the back surface of the ceiling material for automobiles.

A portion to which the resin molded body with a hook-and-loop fastener was attached was cut out from the obtained ceiling material for automobiles, and after being engaged with the polyester woven hook-and-loop fastener, various tests similar to those of Example 1 were performed. The results are shown in the following Table 1 and Table 2.

Reference Example 1

The resin molded body with a hook-and-loop fastener produced in Example 1 was attached to the back surface of a ceiling material for automobiles similar to that used in Example 1 with a pressure-sensitive adhesive. To be specific, HYPERJOINT H8008F manufactured by Nitto Denko Corporation was used as the pressure-sensitive adhesive.

A portion to which the resin molded body with a hook-and-loop fastener was attached was cut out from this ceiling material for automobiles, and after being engaged with the polyester woven hook-and-loop fastener, various tests similar to those of Example 1 were performed. The results are shown in the following Table 1 and Table 2.

Comparative Example 1

As a comparative hook-and-loop fastener, there was used a woven fabric hook-and-loop fastener having male-type engaging element density of 40 elements/cm$^2$, which was made of nylon monofilaments having male-type engaging elements with a thickness (diameter) of 180 μm and a height of 2.65 mm, and whose back surface was coated with a resin liquid made of polyurethane.

Then, the male-type engaging element side surface of the woven fabric hook-and-loop fastener was covered with silicone rubber and cut into a size having a length of 40 mm and a width of 20 mm in the same manner as in Example 1.

Next, this hook-and-loop fastener was set in a concave portion in a die so that the engaging element was on the bottom surface side of the concave portion, and the same polypropylene melt as in Example 1 was injected into the die and molded, and then the silicone rubber covering the surface of the hook-and-loop fastener was removed.

This comparative resin molded body with a hook-and-loop fastener was attached to a ceiling material for automobiles by being fitted into a polypropylene attaching tool fixed to the back surface of the ceiling material for automobiles.

In the same manner as in Example 1, a portion to which the comparative resin molded body with a hook-and-loop fastener was attached was cut out from the obtained ceiling material for automobiles, and after being engaged with the polyester woven hook-and-loop fastener, various tests similar to those of Example 1 were performed. The results are shown in the following Table 1 and Table 2.

Comparative Example 2

A male-type molded hook-and-loop fastener was produced in the same manner as in Example 1 except that the resin used for molding was changed from polyester elastomer to polypropylene in the method for producing the male-type molded hook-and-loop fastener of Example 1. Then, the obtained male-type molded hook-and-loop fastener was attached to a ceiling material for automobiles similar to the ceiling material for automobiles used in Example 1 using a pressure-sensitive adhesive similar to the pressure-sensitive adhesive used in Reference Example 1.

In the same manner as in Example 1, a portion to which the comparative resin molded body with a hook-and-loop fastener was attached was cut out from the obtained ceiling material for an automobile, and after being engaged with the polyester woven hook-and-loop fastener, various tests similar to those of Example 1 were performed. The results are shown in the following Table 1 and Table 2.

Example 3

A male-type molded hook-and-loop fastener was produced in the same manner as in Example 1, except that the shape of the male-type engaging element was changed from that having two protruding portions in the vertical direction to that having one protruding portion in the vertical direction and a height of 2.2 mm, and the length of the projection for preventing sticking was 20% of the height of the male-type engaging element, and the pigment to be added was changed to black carbon black (the content of carbon black in the composition was 0.6% by mass).

Then, this male-type molded hook-and-loop fastener was cut into a size having a length of 20 mm and a width of 40 mm in the same manner as in Example 1, and was set in the same die as in Example 1. Next, the same polypropylene melt as in Example 1 was injected into the die and molded, then cooled and taken out. Then, the resulting polypropylene resin plate with a hook-and-loop fastener was fitted into an aluminum attaching tool fixed to the back surface of the ceiling material for automobiles to be attached to the ceiling material for automobiles.

In the same manner as in Example 1, a portion to which the comparative resin molded body with a hook-and-loop fastener was attached was cut out from the obtained ceiling material for automobiles, and after being engaged with the polyester woven hook-and-loop fastener, various tests similar to those of Example 1 were performed. The results are shown in the following Table 1 and Table 2.

Example 4

The resin molded body with a hook-and-loop fastener produced in Example 3 was attached to the ceiling material for automobiles in the same manner as in Example 2.

In the same manner as in Example 1, a portion to which the comparative resin molded body with a hook-and-loop fastener was attached was cut out from the obtained ceiling material for automobiles, and after being engaged with the polyester woven hook-and-loop fastener, various tests similar to those of Example 1 were performed. The results are shown in the following Table 1 and Table 2.

TABLE 1

| | Initial engaging force at normal temperature | | Initial engaging force at 115° C. | |
|---|---|---|---|---|
| | Tensile shear strength (N/cm$^2$) | Peel strength (N/cm) | Tensile shear strength (N/cm$^2$) | Peel strength (N/cm) |
| Example 1 | 64.2 | 4.82 | 33.1 | 2.54 |
| Example 2 | 62.5 | 4.75 | 31.8 | 2.37 |
| Example 3 | 44.9 | 3.37 | 23.2 | 1.79 |
| Example 4 | 41.2 | 3.21 | 21.9 | 1.71 |
| Reference Example | 63.5 | 4.81 | Peeling occurs in the pressure-sensitive adhesive layer during peeling. | |
| Comparative Example 1 | 10.3 | 0.96 | 2.5 | 0.12 |
| Comparative Example 2 | 70.8 | 5.23 | Peeling occurs in the pressure-sensitive adhesive layer during peeling | |

TABLE 2

| | Engaging force after repeating engagement and peeling five times at normal temperature | |
|---|---|---|
| | Tensile shear strength (N/cm$^2$) | Peel strength (N/cm) |
| Example 1 | 64.2 | 42.7 |
| Example 2 | 62.5 | 41.8 |
| Example 3 | 44.9 | 33.4 |
| Example 4 | 41.2 | 30.8 |
| Reference Example | 63.5 | 40.2 |
| Comparative Example 1 | 10.3 | 9.7 |
| Comparative Example 2 | 70.8 | 21.3 |

As is clear from the above results, in Examples 1 to 4, the initial engaging force at normal temperature and 115° C. is extremely excellent, and there is no problem in terms of the attaching strength of the ceiling material for automobiles even after repeated engagement and peeling.

Further, even when the engagement and peeling are repeated, the male-type engaging element of the male-type molded hook-and-loop fastener is hardly torn, and the fitting portion and the hot-melt adhesive portion are not detached at all.

In addition, the polypropylene plate with the hook-and-loop fastener is firmly fixed to the ceiling material for automobiles, and there is no possibility that the polypropylene plate is detached from the ceiling material for automobiles.

Furthermore, since the hook-and-loop fastener is colored, the position of the hook-and-loop fastener can be clearly recognized, and alignment when attaching the ceiling plate for automobiles to the vehicle body is easy, resulting in excellent workability.

However, with respect to the male-type molded hook-and-loop fasteners of Examples 3 and 4, if the engaging force is too high and the engagement and peeling are repeated, there is a concern that a split may occur on the loop hook-and-loop fastener side of the engaging counterpart when the ceiling material for automobiles is peeled off from the vehicle body. Further, in the cases of Examples 3 and 4, when the engagement and peeling were repeated, the loop elements of the female-type hook-and-loop fastener as the engaging counterpart were cut in some places.

On the other hand, in Reference Example, the adhesive force of the pressure-sensitive adhesive at 115° C. was low, and when a force was applied to peel the pressure-sensitive adhesive between the hook-and-loop fasteners, peeling occurred not between the hook-and-loop fasteners but in the pressure-sensitive adhesive layer, and there was a possibility that the ceiling material for automobiles was peeled off from the vehicle body.

Also in the case of the woven fabric hook-and-loop fastener of Comparative Example 1, the engaging force at normal temperature and 115° C. was not sufficient, and there was a possibility of peeling off as in the case of Reference Example.

Further, also in the case of the polypropylene molded hook-and-loop fastener of Comparative Example 2, the adhesive force at 115° C. of the pressure-sensitive adhesive was lowered, and when a force was applied to peel the pressure-sensitive adhesive between the hook-and-loop fasteners, peeling occurred not between the hook-and-loop fasteners but in the pressure-sensitive adhesive layer, and there was a possibility that the ceiling material for automobiles was peeled off from the vehicle body.

REFERENCE SIGNS LIST

1: Male-type molded hook-and-loop fastener
2: Resin molded body
3, 23: Male-type engaging element
4, 24: Base plate
5: Stem portion
6: Protruding portion
7: Embedded element
8, 28: Ridge portion
9: Sticking preventing projection
10, 20: Direction of row of male-type engaging elements
31: Die
32: Male-type engaging element accommodating concave portion

The invention claimed is:

1. A resin molded body with a hook-and-loop fastener, which is formed by integrating a non-foamed resin molded body and a male-type molded hook-and-loop fastener, wherein the male-type molded hook-and-loop fastener has at least a base plate, a plurality of male-type engaging elements rising from a front surface of the base plate, and a plurality of embedded elements rising from a back surface of the base plate, wherein a resin constituting the male-type molded hook-and-loop fastener is at least one selected from polyester elastomer and polyamide, and the resin molded body and the male-type molded hook-and-loop fastener are integrated by embedding at least a part of the embedded elements in the resin molded body, wherein a ridge portion continuous in a row direction is present on the base plate, and the male-type engaging element is formed on the ridge portion along the row direction, and wherein the thickness of the resin molded body is 1.0 to 50.0 mm, the base plate of the male-type molded hook-and-loop fastener being integrated with a substantially central portion of the resin molded body and having a smaller area than the resin molded body, arranged such that an edge portion of the resin molded body and an edge portion of the base plate of the male-type molded hook-and-loop fastener are never in contact with each other with a distance between the edge portions being 5-50 mm.

2. The resin molded body with a hook-and-loop fastener according to claim 1, wherein the male-type engaging element has a stem portion rising from the base plate and a protruding portion protruding from the stem portion, the protruding portion protrudes from a middle or a tip of the stem portion, and the tip of the protruding portion is inclined in a direction of the base plate.

3. The resin molded body with a hook-and-loop fastener according to claim 1, wherein the male-type engaging element is an engaging element that rises from the base plate, gradually tapers from a root to a tip without branching in the middle or at the tip portion, bends in the same direction as the row direction of the male-type engaging elements in the middle, and has a shape in which the tip approaches the surface of the base plate.

4. The resin molded body with a hook-and-loop fastener according to claim 2, wherein the male-type engaging element has plural protruding portions protruding from the stem portion, two or more of the protruding portions being provided in a vertical direction of the stem portion, and a total of four or more of the protruding portions being provided bilaterally symmetrically with respect to the stem portion.

5. The resin molded body with a hook-and-loop fastener according to claim 1, wherein the male-type molded hook-and-loop fastener and the resin molded body have different color tones.

6. The resin-molded body with a hook-and-loop fastener according to claim 1, wherein the base plate has a thickness of 0.10 to 0.40 mm, and a height of the male-type engaging element from the base plate surface is 1.5 to 4.0 mm.

7. The resin molded body with a hook-and-loop fastener according to claim 2, wherein a ratio of an interval (mm) between the stem portions to a thickness (mm) of the stem portions is 0.30 to 0.80 times when a row direction of the male-type engaging elements is used as a reference.

8. The resin molded body with a hook-and-loop fastener according to claim 1, wherein the distance between the edge portions is 8 to 20 mm.

9. The resin molded body with a hook-and-loop fastener according to claim 1, wherein the base plate, the male-type engaging element, and the embedded element are formed of the same resin composition, and the base plate is composed of a single layer.

10. A method for producing the resin molded body with a hook-and-loop fastener according to claim 1, the method comprising the steps of: inserting the male-type molded hook-and-loop fastener into a male-type molded hook-and-loop fastener accommodating concave portion in a die; and injecting a non-foamable resin liquid into the die to integrate the male-type molded hook-and-loop fastener and the resin molded body.

11. The method for producing a resin molded body with a hook-and-loop fastener according to claim 10, wherein a die having a male-type engaging element accommodating concave portion in the male-type molded hook-and-loop fastener accommodating concave portion is used.

12. A method for fixing a ceiling material for automobiles to a vehicle body, the method comprising: attaching the resin molded body with a hook-and-loop fastener according to claim 1 to a back surface of the ceiling material for automobiles by any one of a method of attaching using an attaching tool and a method of attaching by adhesion using a hot melt resin; and then engaging a female-type hook-andloop fastener attached to a vehicle body main body with a male-type molded hook-and-loop fastener of the resin molded body with a hook-and-loop fastener.

13. The resin molded body with a hook-and-loop fastener according to claim 1, wherein the back surface of the base plate comprises at least two adjacent rows of male-type engaging elements, with a row of embedded elements present parallel to a row of said male-type engaging elements.

* * * * *